April 4, 1944.  I. H. BETTIS  2,345,725

TOOL JOINT WITH DOUBLE TAPERED SOCKET

Filed Nov. 3, 1941

Irvin H. Bettis
INVENTOR

BY Jesse R. Stone

Patented Apr. 4, 1944

2,345,725

UNITED STATES PATENT OFFICE 2,345,725

TOOL JOINT WITH DOUBLE TAPERED SOCKET

Irvin H. Bettis, Los Angeles, Calif., assignor to Hughes Tool Company, Houston, Tex., a corporation of Delaware Application November 3, 1941, Serial No. 417,668

3 Claims. (Cl. 285—146)

The invention relates to tool joints employed on drill stems in well drilling operations. Such joints connect together the sections of drill stem and hence must be strong and leak-proof in order to withstand the heavy duty which they must perform. The invention relates particularly to the threaded connection between the pipe and the socket of the tool joint.

In the operation of a drill stem in rotating the bit at the bottom of the hole the drill stem must undergo heavy torque strains, and it is also subjected to lateral bending strains due to the bending of the stem under the heavy loads imposed thereon and due to the fact that the drill stem operates in well bores which are not vertical, but which are curved. There is a tendency, therefore for the drill stem to break at the tool joint. This is due to the change in thickness of the pipe at the joint and to the strains developed in screwing up the pipe within the socket of the tool joint. The walls of the tool joint are normally thicker than those of the pipe and in screwing the pipe into the threaded socket of the joint a lateral bursting strain of the pipe upon the joint is produced. This is usually considered as a hoop tension of the pipe socket upon the end of the pipe. This tension is normally greatest near the last engaged thread between the pipe and the joint. There is, therefore, a tendency to develop fatigue due to the flexing of the pipe relative to the joint and particularly at the point where the hoop tension is greatest at the last thread.

It is an object of my invention to so form the tool joint socket that the maximum hoop tension of the socket upon the pipe end will be developed at a point away from the last engaged thread and to support the pipe outwardly away from this point.

I desire to change the taper on the threaded area of the tool joint toward the end of the socket so that it will not develop a high hoop tension but will come in supporting engagement with the pipe so as to protect the threads at the point where the tension is highest.

Referring to the drawing herewith,

Figure 2:
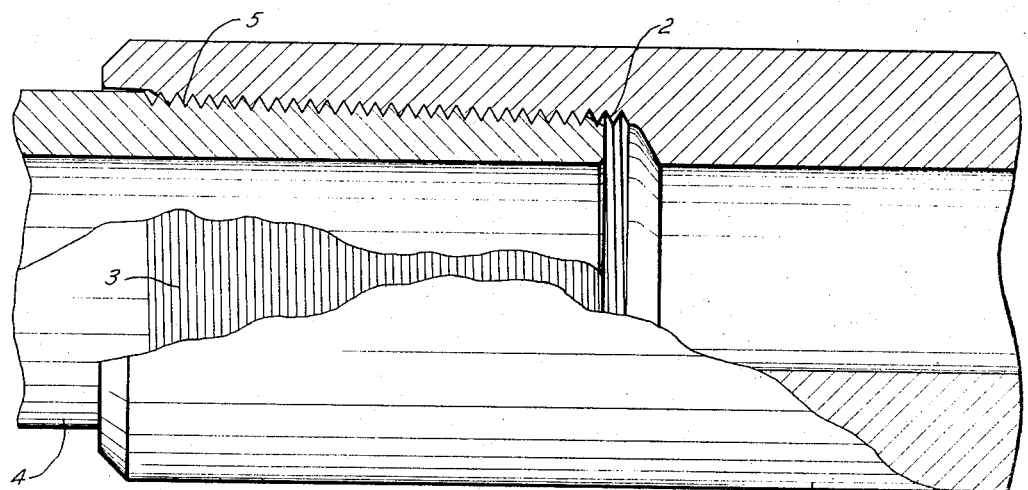
Fig. 2 is a view similar to Fig. 1 but showing the joint screwed up tightly so as to develop strains upon the threaded connection.

In the drawing I have illustrated the tool joint 1 as provided with a threaded socket 2 for engagement with the threaded end 3 of the pipe section 4. It is the usual practice to taper the threaded end of the pipe and the socket on the tool joint with a taper of ¾ of an inch to the foot. When this is done and the pipe end is forced tightly into its threaded engagement with the socket the hoop tension which is built up on the socket is found by test to be greatest somewhere adjacent the last engaged thread, which has been indicated at 5 in Fig. 2.

Figure 3:
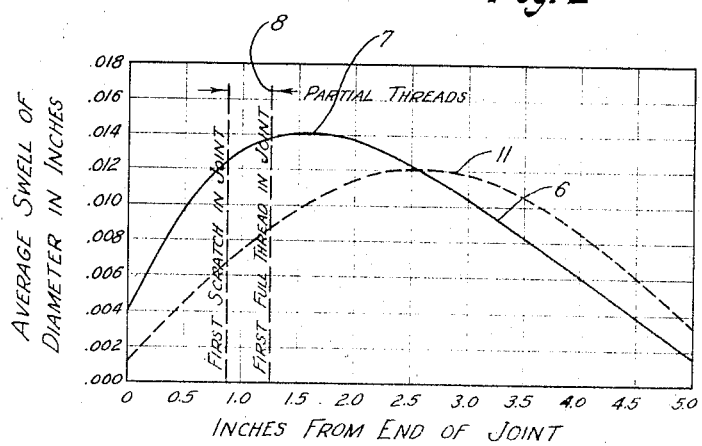
Fig. 3 is a diagram illustrating the tension upon the threaded area of the joint developed in screwing up the joint.

With reference to the diagram shown in Fig. 3, the line 6 shows the hoop tension developed on the normal joint. Thus it will be seen that the point of greatest tension along the threaded socket occurs at 7, which is about an inch and a half from the end of the socket. Also, in this diagram the last fully engaged thread is positioned at 8. It will thus be seen that the point of the greatest hoop tension is developed close to the first fully engaged thread and at this point there is a tendency of the pipe to develop a crack due to the flexing of the pipe in operation.

This tendency to crack the pipe end at the last engaged thread is a well recognized difficulty in the construction of tool joints. Many different expedients, such as welding the end of the socket to the pipe, or the shrinking of the socket upon the pipe, so as to support the socket upon the pipe away from the threaded area, and thus protect the last engaged thread from lateral bending strain, have been resorted to. These forms of construction have the disadvantage that the connection cannot be very readily accomplished in the field and that the operations necessary to complete the connection consume a material amount of time and require some special tools.

Figure 1:
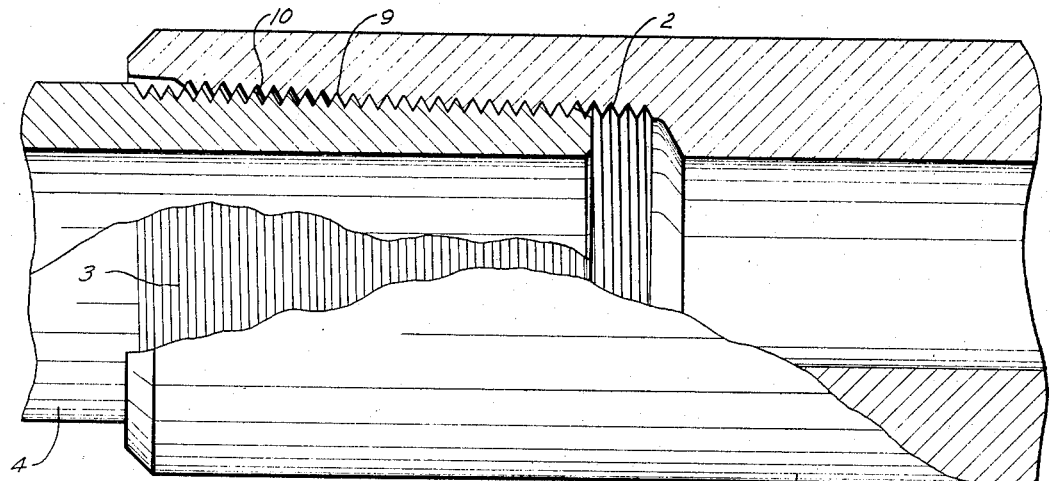
Fig. 1 is a broken longitudinal section through a tool joint and pipe end showing the manner in which the pipe engages within the threaded socket of the joint according to my invention.

I desire to take the strain from the last engaged thread by changing the taper upon the socket. The taper upon the threaded end of the pipe is the normal taper of ¾ of an inch to the foot. At a point spaced approximately two inches from the end of the socket, as indicated at 9, the taper is varied to flare slightly outwardly from that point to the end of the socket. The angle of the taper relative to the axis of the joint is more obtuse. Experiments indicate that this taper should be approximately ⅞ of an inch to the foot. This may, however, be varied slightly to accord with conditions but this angle of taper is found to be normally satisfactory. In Fig. 1 this change in taper is shown as providing a space 10 between the threads of the socket and the threads of the pipe end. This angle has been exaggerated, for purposes of illustration, in the drawing. In Fig. 1 the pipe end has been screwed up by hand until it is what is termed hand-tight. The pipe then has to be screwed by mechanical means into the socket until it is mechanically tight, and in Fig. 2 the pipe end is shown as having been tightened into its final position. This brings the threads along the flaring taper into contact with the pipe.

The strains which are developed in screwing the pipe end into the socket of the tool joint under these conditions is illustrated by the dotted line 11 in Fig. 3. Due to the flaring end upon the tapered socket the point of greatest stress is developed at a point along the socket, which is normally about 2½ inches from the end of the socket, as will be seen from Fig. 3 of the drawing. Also, the amount of hoop tension developed will be slightly less due to the shape of the socket. Considering the hoop tension of the socket upon the pipe as a bursting strain delivered from the pipe end to the socket, said bursting strain tends to develop a swell or increase in the outer diameter of the socket at the point where the bursting strain is greatest. This difference in diameter can be measured with calipers and the ordinates at the left of the drawing indicate the amount of the swell. The swell upon the socket away from the end tends to contract the end of the socket slightly and the engagement along the socket against the pipe end beyond the last engaged thread is sufficient to protect the pipe end at this point from lateral strains which tend to develop fatigue cracks. At the area of the last engaged thread the tension upon the pipe end is insufficient to develop material strains.

By thus forming the thread upon the socket end of the tool joint I am enabled to screw the tool joint upon the pipe in the field without difficulty and when the joint has been screwed firmly into position the hoop tension at the last engaged thread is not great and the maximum strain is removed from the last engaged thread to a point spaced inwardly from the end of the socket. The last engaged thread is thus supported toward the outer side by the engagement of the socket with the pipe and is not under tension sufficient to cause fatigue. When fracture occurs in the pipe due to the strains developed in drilling they will tend to occur at points along the pipe away from the joints rather than at the joint and the failure of the pipe at the threaded end will be to a large extent eliminated.

What I claim as new is:

1. In a pipe connection wherein the pipe has thereon a uniformly tapered and threaded male member, the combination of a socket member, threaded and tapered to receive said male member, the said socket member being tapered at two different angles, the taper at the inner end thereof being the same as the taper of said pipe, the taper adjacent the outer end of said socket having a slight outward flare so that when the members are screwed together by hand there will be a clearance between the threads of said members along the area of said outward flare, said clearance disappearing when the members are screwed up further by mechanical means.

2. In a tool joint and pipe connection, including a pipe and having a threaded area thereon of uniform taper, the combination of a tool joint socket threaded to connect therewith, the taper of said socket being the same as that of the pipe from its inner end to a point spaced from its outer end, and said taper flaring slightly outwardly to said end from that point, so that when said pipe end and socket are screwed together by hand there will be a clearance between the mating threads for about two inches from the outer end of said socket, said clearance being taken up when the joint is further screwed up.

3. A tool joint socket threaded and tapered to engage a pipe end, the taper adjacent the outer end of said socket along the threaded area being formed on a more obtuse angle relative to the joint axis than the remainder of said socket so that when said socket is screwed upon the pipe end with normal hand pressure there will be a clearance between the threads on said pipe and the threads on said socket along the outer end of said socket.

IRVIN H. BETTIS.